(12) United States Patent
Sudo

(10) Patent No.: US 8,891,133 B2
(45) Date of Patent: Nov. 18, 2014

(54) IMAGE PROCESSING DEVICE AND METHOD OF PROCESSING IMAGE

(75) Inventor: Takao Sudo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 882 days.

(21) Appl. No.: 12/656,733

(22) Filed: Feb. 16, 2010

(65) Prior Publication Data

US 2010/0214619 A1 Aug. 26, 2010

(30) Foreign Application Priority Data

Feb. 23, 2009 (JP) ................................. 2009-039151

(51) Int. Cl.
*H04N 1/40* (2006.01)
*H04N 1/387* (2006.01)

(52) U.S. Cl.
CPC .................................. *H04N 1/3875* (2013.01)
USPC ....................................................... 358/3.24

(58) Field of Classification Search
USPC .................................... 358/1.8, 1.2; 382/201
See application file for complete search history.

(56) References Cited

U.S. PATENT DOCUMENTS

| | | | | |
|---|---|---|---|---|
| 5,081,489 A | * | 1/1992 | Ishikawa et al. | 399/84 |
| 2003/0160977 A1 | * | 8/2003 | Nishikawa et al. | 358/1.2 |
| 2007/0041051 A1 | * | 2/2007 | Tanaka | 358/1.18 |
| 2009/0067727 A1 | * | 3/2009 | Hirohata | 382/201 |

FOREIGN PATENT DOCUMENTS

| | | |
|---|---|---|
| JP | A-09-307739 | 11/1997 |
| JP | A-11-164125 | 6/1999 |
| JP | A-2001-197286 | 7/2001 |
| JP | A-2005-191610 | 7/2005 |
| JP | A-2005-193559 | 7/2005 |
| JP | A-2006-262535 | 9/2006 |

* cited by examiner

*Primary Examiner* — Benny Q Tieu
*Assistant Examiner* — Michael Burleson
(74) *Attorney, Agent, or Firm* — Muncy, Geissler, Olds & Lowe, P.C.

(57) ABSTRACT

An image processing device for arranging and printing images of a plurality of documents on a single recording sheet includes a memory part configured to memorize: image information and sizes of documents, a size of the single recording sheet, and a number of the documents; an input part configured to input image information, a document size detecting part configured to detect sizes of the documents; and an editing part configured to compare the sizes of the documents with a divided area of the single recording sheet. The editing part is further configured to arrange and print the image information of one of the documents on the single recording sheet without reducing the image of the one of the documents when the size of the document is equal to or less than the size of the divided area of the single recording sheet.

25 Claims, 11 Drawing Sheets

| Page No. [P] | Document Size of Each Page [S] | Same Magnification Flag [F] | N-Up Value [N] | Printing Sheet Size [Z] |
|---|---|---|---|---|
| 1 | A3 | 0 | 2 | A3 |
| 2 | A3 | 0 | | |
| 3 | A3 | 0 | | |
| 4 | A4 | 1 | | |
| 5 | A4 | 1 | | |
| 6 | A4 | 1 | | |
| 7 | A3 | 0 | | |
| · | · | · | | |
| · | · | · | | |
| · | · | · | | |
| P-1 | Sp-1 | Fp-1 | | |
| P | Sp | Fp | | |

Fig. 7

IMAGE PROCESSING DEVICE AND METHOD OF PROCESSING IMAGE

CROSS REFERENCE

The present application is related to, claims priority from and incorporates by reference Japanese patent application number 2009-039151, filed on Feb. 23, 2009.

TECHNOLOGY FIELD

The present application relates to an image processing device which is capable of multi-page printing and to a method of processing an image. In multi-page printing, contents of a plurality of pages are arranged and printed on a single recording sheet.

BACKGROUND

Conventional image processing devices perform multi-page printing by reducing each page a document into 1/N size where the document is structured with N pages (N is equal to or greater than 2), and by arranging the reduced documents on one page of a recording sheet. Such a device is disclosed, for example, in Japanese laid-open application publication number 2005-193559, paragraphs [0033]-[0055], FIGS. 1 and 5.

However, because the aforementioned conventional image processing devices uniformly reduce all pages of the documents of N page(s) into 1/N size, when different sized documents are included, an image of a smaller document is reduced with the same reducing ratio as for a larger document. Thereby, the image of the smallest document becomes so reduced (unnecessarily) that the image of the smaller document might not be readable. For example, when one page of A3 size document and one page of A4 size document are both printed by the multi-page printing on one page of an A3 size recording sheet, each of the A3 size and the A4 size documents is going to be reduced to ½ size. As a result, the image of the reduced A4 size document becomes too small to read.

The disclosed device and method operates to solve the aforementioned problems.

In particular, even when different sized documents are conducted for the multi-page printing, the images of smaller documents are printed in a proper (readable) size.

SUMMARY

An image processing device of the present application for arranging and printing images of a plurality of documents on a single recording sheet includes; a memory part configured to memorize: image information of the plurality of documents, sizes of the plurality of documents, a size of the single recording sheet, and a number of the plurality of documents that are to be arranged on the single recording sheet; an input part configured to input image information of the plurality of documents and to have the memory part memorize the image information; a document size detecting part configured to detect a size of each of the plurality of documents from the image information memorized in the memory part and to have the memory part memorize the size of each of the plurality of documents; and an editing part configured to compare the size of each of the plurality of documents in the memory part with a divided area of the single recording sheet, the divided area of the single recording sheet being determined by dividing the size of the single recording sheet by the number of the plurality of documents that are to be arranged on the recording sheet. Wherein, the editing part is further configured to arrange and print the image information of one of the plurality of documents on the single recording sheet without reducing the image of the one of the plurality of documents when the size of the one of the plurality of documents is equal to or less than the size of the divided area of the single recording sheet.

With the present invention, even when different sized documents are conducted for the multi-page printing, the images of smaller documents are printed in a proper (readable) size.

BRIEF DESCRIPTION OF DRAWINGS

FIG. 7 is an explanatory diagram of an image information table according to the first disclosed embodiment.

DETAILED DESCRIPTION

Hereafter, the disclosed embodiments of the image processing device of the present application are explained with reference to the drawings.

First Embodiment

Figure 2:
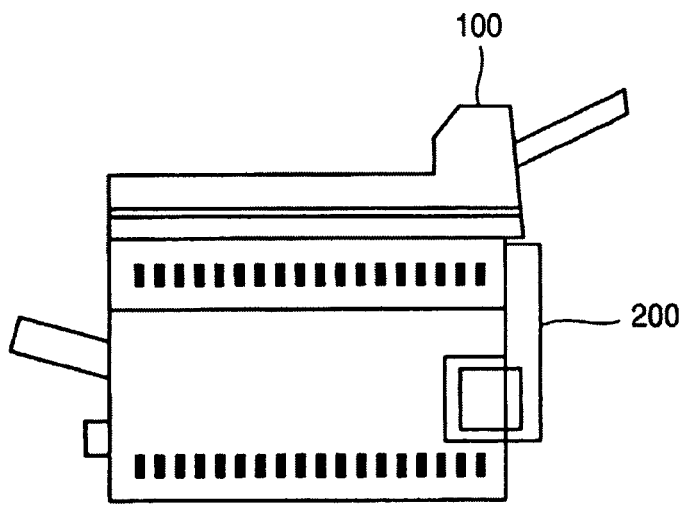
FIG. 2 is an external view of a multifunction machine according to the first disclosed embodiment.

As shown in FIG. 2, a multifunction machine is configured with a scanner 100 as an image reading device for reading images of documents and a printer 200 as an image forming device. The multifunction machine is configured to perform multi-page printing by which images of a plurality of received documents are arranged and printed on a single recording sheet. In the present embodiment, the image processing device is the scanner 100, and the structure of the scanner 100 is explained based on an external view of an automatic document feeder (ADF) unit of the scanner of the first embodiment of FIG. 3, an external view of a flat bed (FB) unit of the scanner of the first embodiment of FIG. 4 and a cross-sectional explanatory diagram of the scanner of the first embodiment of FIG. 5. Moreover, only the structure related to the present application is explained hereafter for ease understanding.

Figure 3:
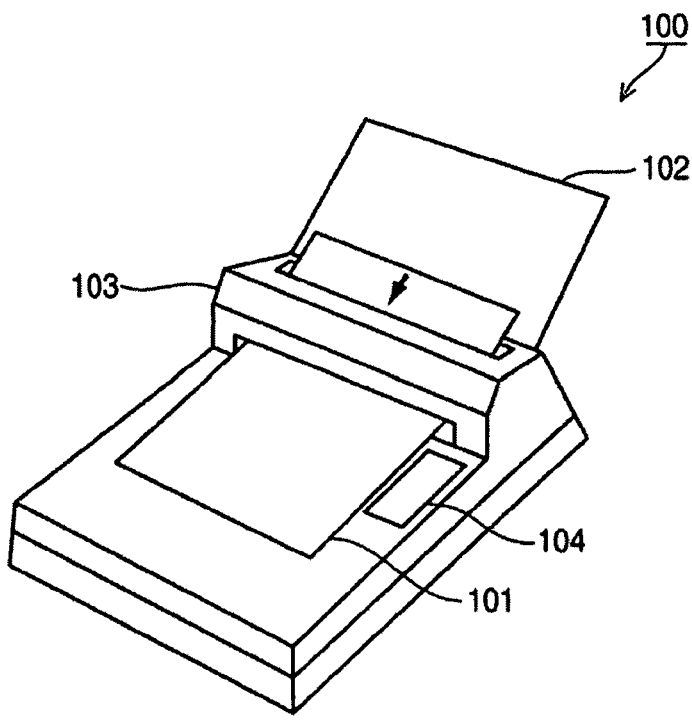
FIG. 3 is an external view of an ADF unit of a scanner according to the first disclosed embodiment.
Figure 4:
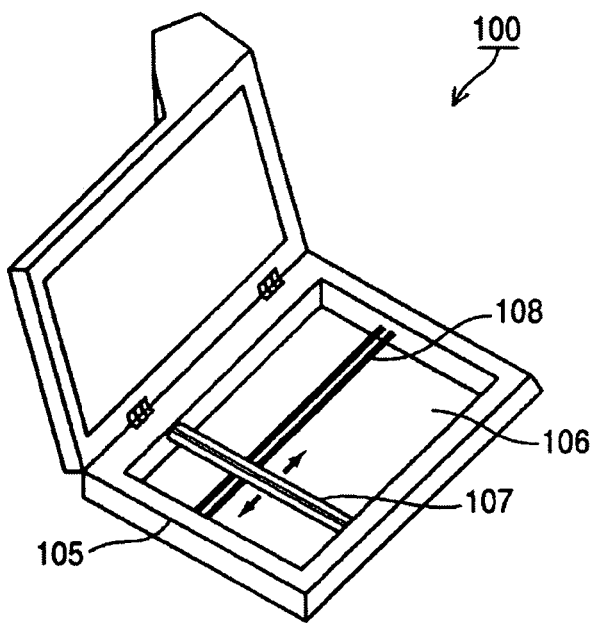
FIG. 4 is an external view of a FB unit of the scanner according to the first disclosed embodiment.

In FIGS. 3 and 4, the scanner 100 is configured with a sheet tray 102, an ADF unit 103, an operation panel 104, and a FB unit 105. The sheet tray 102 operates to place documents 101 for scanning (or reading). The ADF unit 103 operates as a document reader that reads images printed (or recorded) on the document 101 while carrying the documents 101. The operation panel 104 orates to display a performance condition of the scanner 100 and an alarm notification and to set each kind of menu of the scanner 100. The FB unit 105 operates as a document reading part for reading images of documents placed on a platen 106.

The FB unit 105 is configured with the platen 106 on which documents are placed, an FB reader unit 107 for reading the images printed on the documents placed on the platen 106 from bottom side of the platen 106, and an FB carrying unit 108 for moving the FB reader unit 107 along the arrow directions shown in FIG. 4. The ADF unit 103 is configured to carry a plurality of the documents 101 that are placed in the sheet tray 102, one sheet at a time, and to continuously read each image of the documents 101 while the documents 101 go through the unit 103. In contrast, the FB reader unit 107 is configured to only read an image of the document that is currently placed on the platen 106. The FB reader unit 107 reads an image of another document when the user manually replaces the document on the platen 106 with another. In both units 103 and 107, all read images of the documents are combined into sets of image information, and are memorized in a memory part, which will be described later.

Figure 5:
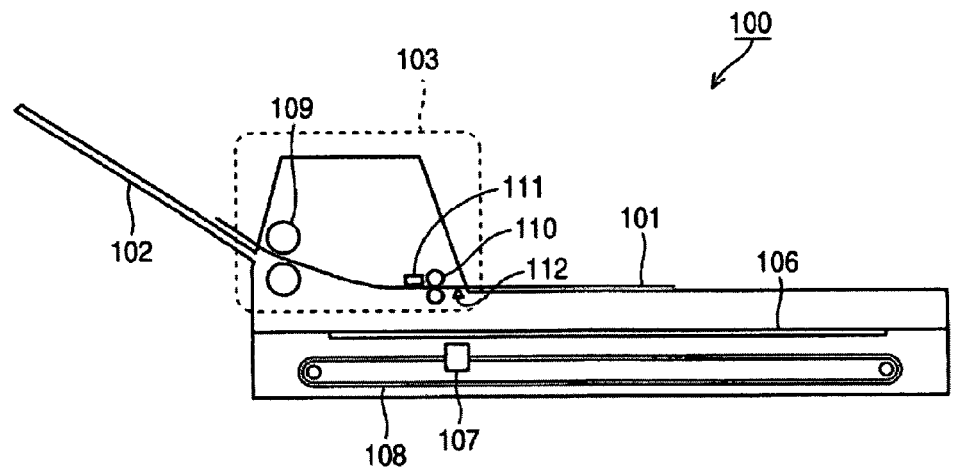
FIG. 5 is a cross sectional explanatory diagram of the scanner according to the first disclosed embodiment.

In FIG. 5, the ADF unit 103 is configured with a pickup roller 109, an ejecting roller 110, an ADF reader unit 111, and a sheet positioning sensor 112. The documents 101 that are placed in the sheet tray 102 are taken by the pickup roller 109, one sheet at a time, and are carried to the inside of the ADF unit 103. The ADF reader unit 111 reads the images of the documents 101 that are carried. The documents 101 are ejected by the ejecting roller 110 to the outside of the ADF unit 103.

The ADF unit 103 includes the sheet positioning sensor 112. When a leading edge of the document 101 that is carried inside the sheet positioning sensor 112 is detected by the sheet positioning sensor 112, the ADF reading unit 111 starts a reading process of the image on the document 101. The ADF reader unit 111 is configured with a light source that is not shown in the figures, a charge-coupled device (CCD) image sensor, and a lens or the like. Image data (image information) of the document can be generated using the ADF reader unit 111 by irradiating light toward the document from the light source, and by measuring a reflected light amount from the document with the CCD image sensor.

Moreover, the explanations of the platen 106 of the FB unit 105, of the FB reader unit 107 and the FB carrying unit 108 are omitted because they are similar to the descriptions above. Next, a structure of the multifunction machine is explained based on the block diagram of the image processing device of the first embodiment. Moreover, in the present disclosed embodiment, it is explained that a set of image information that is read by the scanner means the image information read by the ADF unit 103, and the ADF unit 103 is to read the image information of a plurality of different sized documents 101.

Figure 1:
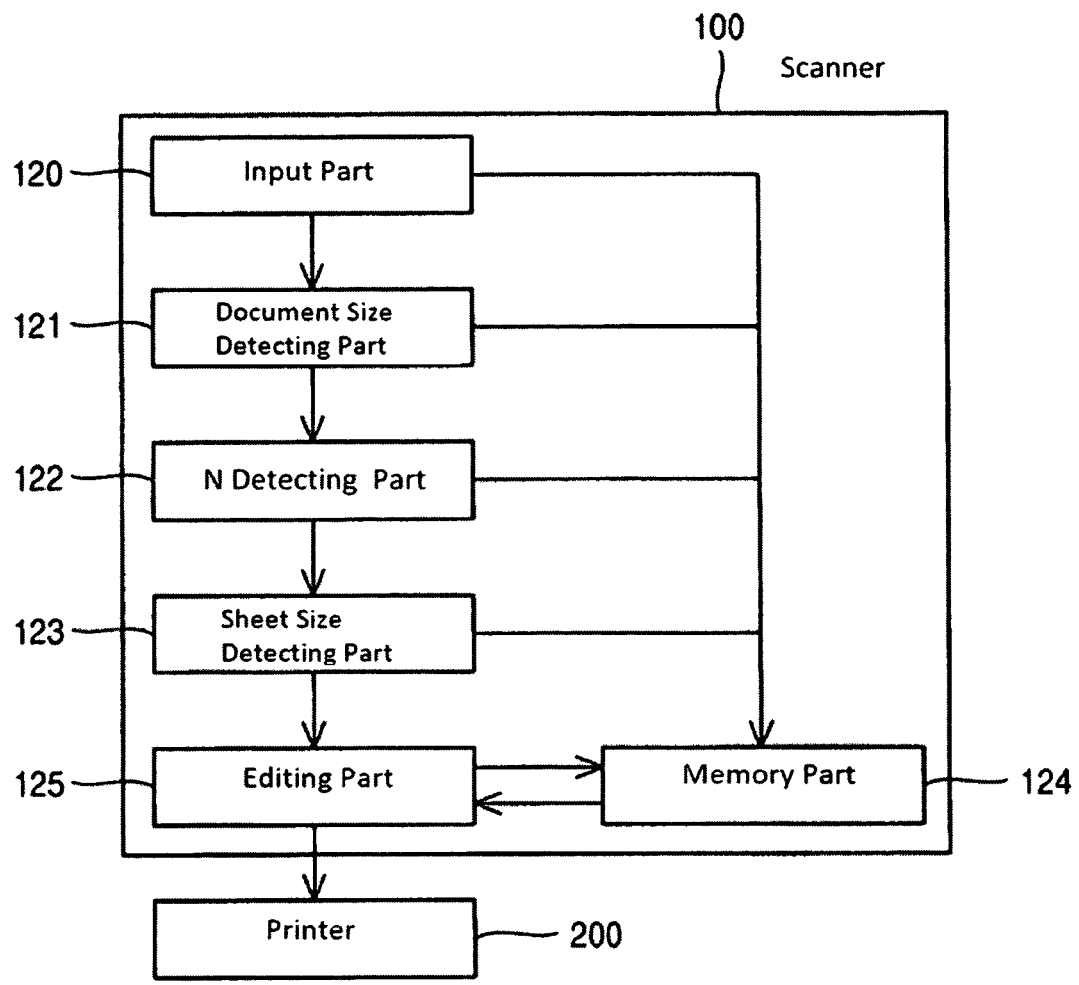
FIG. 1 is a block diagram of an image processing device according to a first disclosed embodiment.

As shown in FIG. 1, the scanner 100 is configured with an input part 120, a document size detecting part 121, a setting value detecting part 122 (also called an N detecting part), a sheet size detecting part 123, a memory part 124, and an editing part 125. The image information of a plurality of documents 101 that are read by the ADF unit 103 is read by the input part 120, and the image information is memorized in the memory part 124.

The document size detecting part 121 detects a size of each page (hereafter, a document size) of the documents 101 from the image information of the documents 101 that are read by the input part 120, and memorizes the detected document size in the memory part 124. The setting value detecting part 122 detects (or receives) a setting value N for presetting the number of documents to be multi-page printed from the operation panel 104 before the image information is read from the input part 120, and the setting value N is memorized in the memory part 124. Herein, the user inputs the setting value N in the operation panel 104 before the multi-page printing. The multi page printing is called "N-Up printing" when the number of documents printed on a single sheet is N (hereafter N="setting value N").

The sheet size detecting part 123, in a manner similar to setting the value N, detects (or receives) a printing sheet size from the input part 120 before the image information is read from the input part 120, and memorizes the printing sheet size in the memory part 124. The printing sheet size is input by the user, and represents the sheet size on which the image information that is read at the input part 120 is printed. The memory part 124 is memory area that is configured to include, for example, a memory device for storing (i.e., memorizing) the image information of the documents 101 that is read at the input part 120, the document size detected at the document size detecting part 121, the setting value N detected at the setting value detecting part 122, and the printing sheet size detected at the sheet size detecting part 123.

Additionally, the setting value N and the printing sheet size may be determined in various ways. For example, the value and size may be: automatically calculated with reference to a preset minimum reduction ratio, a standard sheet size, or a user preferable arrangement style etc.

The editing part 125 compares the document size with the printing sheet size, and determines that the image data of the document 101 should be reduced to 1/N size when the document size is equal to or greater than 1/N of the printing sheet size. On the other hand, the editing part 125 determines to maintain the original document size without reducing the image data of the document 101 when the document size is equal to or less than 1/N of the printing sheet size, and also stores a same magnification flag F (1: reduction, 0: no reduction) in the memory part 124. The same magnification flag F shows whether or not the image information of the document 101 is to be reduced. The same magnification flag F is stored for the every image data document by document.

Moreover, the editing part 125 refers to the values (1 or 0) of the same magnification flags F that are memorized in the memory part 124, and edits the image information of all of the documents 101 by arranging the image information in order to fit in one page of the printing sheet so that the editing part 125 generates the print image data for the multi page printing. In other words, the editing part 125 compares each of the document sizes that are memorized in the memory part 124 with a size of a divided area that is calculated by dividing the size of the recording sheet with the number of documents N. The number N represents the number of documents that are arranged and printed on the single recording sheet. The documents of which sizes are equal to or less than the size of the divided area are arranged on the recording sheet without changing the size of the image. Then, the print image data, including the images, is generated for the multi page printing (N-UP print).

The print image data that is edited at the editing part 125 is transferred to the printer 200 and is printed on the printing sheet. Moreover, the scanner 100 is configured with a control part, such as a central processing unit (CPU), which is not shown in the figures, that controls overall performance of the scanner 100 that is configured with the input part 120, the document size detecting part 121, the setting value detecting part 122, the sheet size detecting part 123, the memory part 124 and the editing part 125 or the like, based on the control program memorized in the memory part 124.

Figure 6:
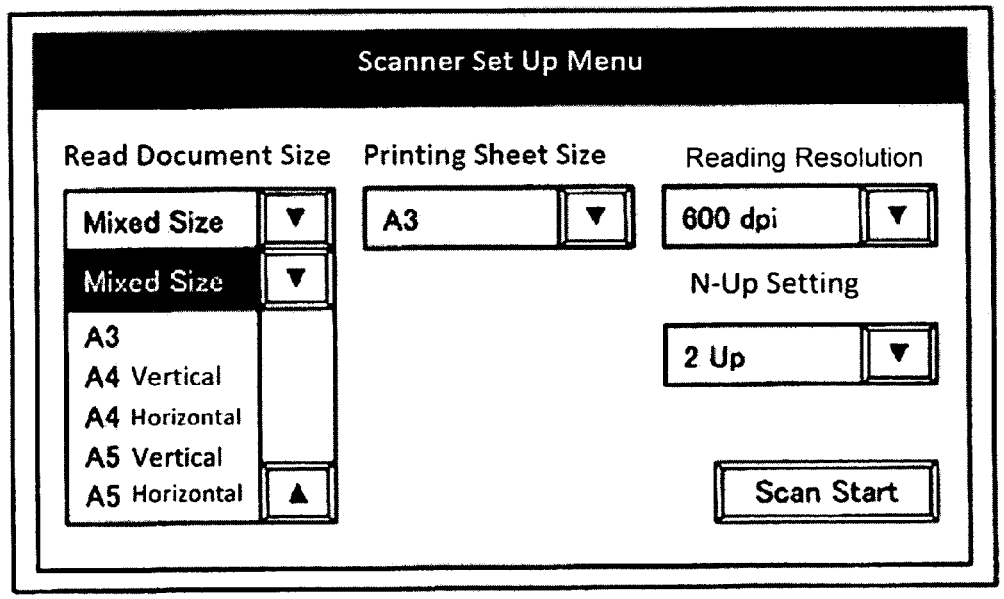
FIG. 6 is an explanatory diagram of the scanner setup menu according to the first disclosed embodiment.

Next, setting items are explained based on the explanatory diagram of the scanner setup menu of the first embodiment of FIG. 6. The setting items are to be set at the operation panel 104 before the image information is read from the input part 120. The scanner set up menu is configured with a read document size, a printing sheet size, reading resolution, an N-Up setting and "Scan Start" button as shown in FIG. 6. The read document size is for setting document sizes of documents read by the input part 120. The printing sheet size is for setting a sheet size on which the print image data that is edited at the editing part 125 is print. The reading resolution is for setting the resolution for reading the image data. The reading resolution is used when the input part 120 reads the image data. The N-Up setting is for setting the page number N of the documents that are arranged on one page of a printing sheet. The Scan Start button is for starting the reading of the documents at the input part 120.

When documents of different sizes are set at the same time in the sheet tray 102, "Mixed Size" should be selected as a read document size. Moreover, FIG. 6 shows, by way of example, that "Mixed Size" is selected for the read document size, A3 is selected for the printing sheet size, 600 dots per inch (dpi) is selected for the reading resolution, and 2Up, which means the setting value N=2, is selected for the N-Up setting.

Next, an image information table memorized in the memory part 124 is explained based on the explanatory diagram of the image information table of the first disclosed embodiment of FIG. 7. The image information table includes the document size, the same magnification flag that shows the necessity of reduction that is judged at the editing part 125, the setting value N that is detected at the setting value detecting part 122, and the size of the printing sheet that is detected at the sheet size detecting part 123. All the above data are stored corresponding to the page number of the documents detected at the document size detecting part 121.

In FIG. 7, the entries indicating the page number P that is read at the input part 120 are referred to with reference numeral 150. The entries indicating the document size S are referred to with reference numeral 151, and shows the sizes of each document that is detected at the document size detecting part 121. For example, the exemplary embodiment of FIG. 7 shows documents that are of size A3 or A4 or the like. The entries indicating the same magnification flag F are referred to with reference numeral 152, and shows the values of the same magnification flags F, 1 or 0. The values of the flags F are used for the multi-page printing. When the image information of the document can be arranged without reduction, the same magnification flag F is set "1." When it needs to be arranged by reducing the image data to 1/N, the same magnification flag F is set "0."

The entry indicating the N-Up value is referred to with reference numeral 153 that is a setting value N detected at the setting value detecting part 122 (where N is an integer number that is equal to or greater than 2). The entry indicting printing sheet size Z is referred to with reference numeral 154, and shows the sizes of the printing sheets that are detected at the sheet size detecting part 123. The same magnification flag F is set F=1 when the document size S of each page is less than or equal to the printing sheet size times the reducing value (i.e., if $S<Z\times1/N$), and is set F=0 when the document size S of each page is greater than the printing sheet size times the reducing value (i.e., if $S>Z\times1/N$).

The aforementioned effects are explained hereafter. First of all, the printing result when the setting value N=2 (i.e., "2-Up printing") in the present embodiment is explained referring to the explanatory diagram of the print result of the first embodiment of FIG. 8. In this disclosed embodiment, the printing sheet size is set to A3. Row (a) of FIG. 8 shows when an A3 size document and an A4 size document are used for printing, and row (b) of FIG. 8 shows when an A3 size document and an A5 size document are used.

Figure 8:
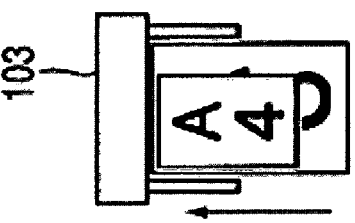
FIG. 8 is an explanatory diagram of a printing result according to the first disclosed embodiment.

As shown in FIG. 8, the documents in the sheet tray 102 are placed such that the longitudinal direction of the documents is in the sheet feeding direction of the document(s) in the ADF unit 103. In both the case of row (a) row and row (b) of FIG. 8, A3 size printing sheets are used. However, according to the print result of 2-Up printing by conventional controls, the image information of all of the documents are always reduced into ½ size regardless of the size of the read documents. In other words, the image information of all of the documents are conventionally reduced into 1/N size regardless of the size of the read documents. These reduced images of the documents are then arranged on the printing sheet.

On the other hand, according to the result of the 2-Up printing of the present disclosed embodiment, documents can be arranged on the printing sheet with the same magnification (or without reducing the size) because it is possible to arrange the document's image on the single printing sheet without reducing the size when the read document size is equal to or less than ½ of the size of the printing sheet. Moreover, as described in the present embodiment, the images of all documents are arranged on the recording sheet by rotating 90 degrees to the right for the 2-Up printing. In this case, the documents placed on the sheet tray 102 are arranged on a single recording sheet in the same direction when all of the documents are set in the same direction on the sheet tray 102. The document style, either portrait or landscape, does not matter for the direction of the arranged documents. Then, the arranged images of the documents are printed.

Figure 9A:
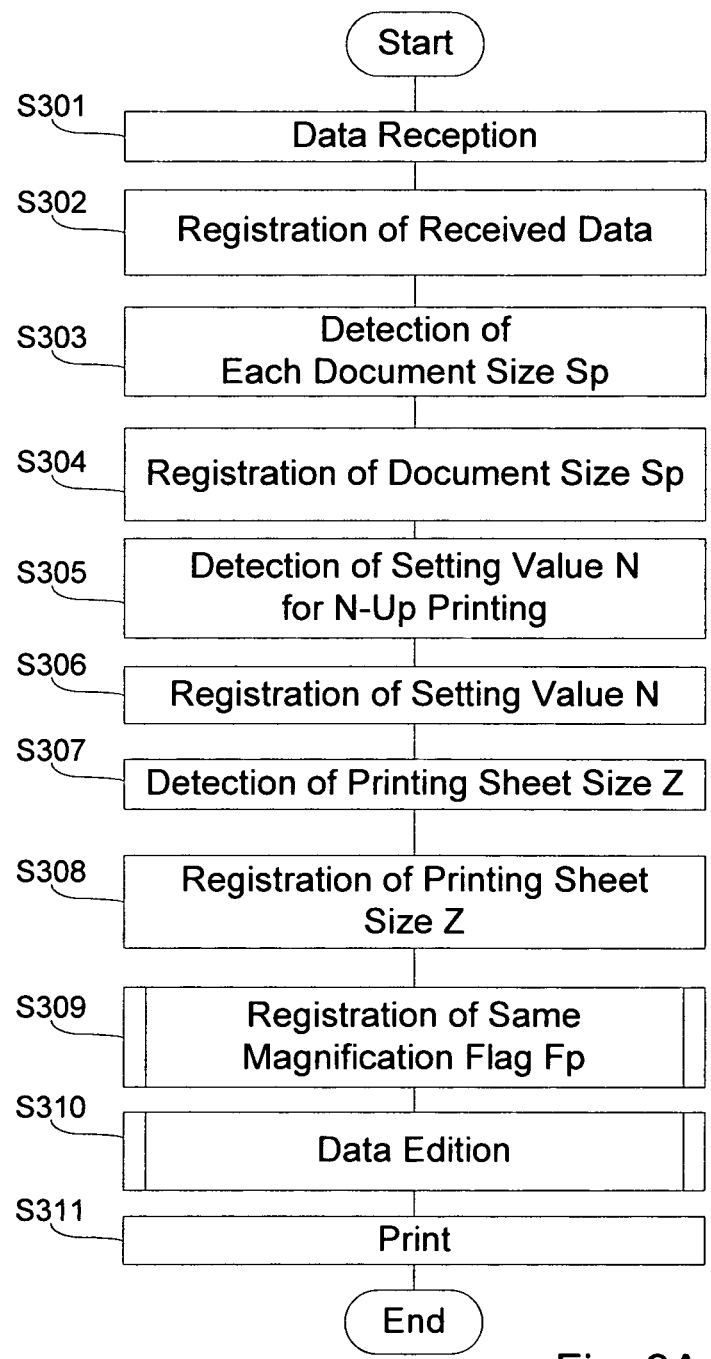
FIGS. 9A-9C are flow diagrams showing an image processing according to the first disclosed embodiment.
Figure 9C:
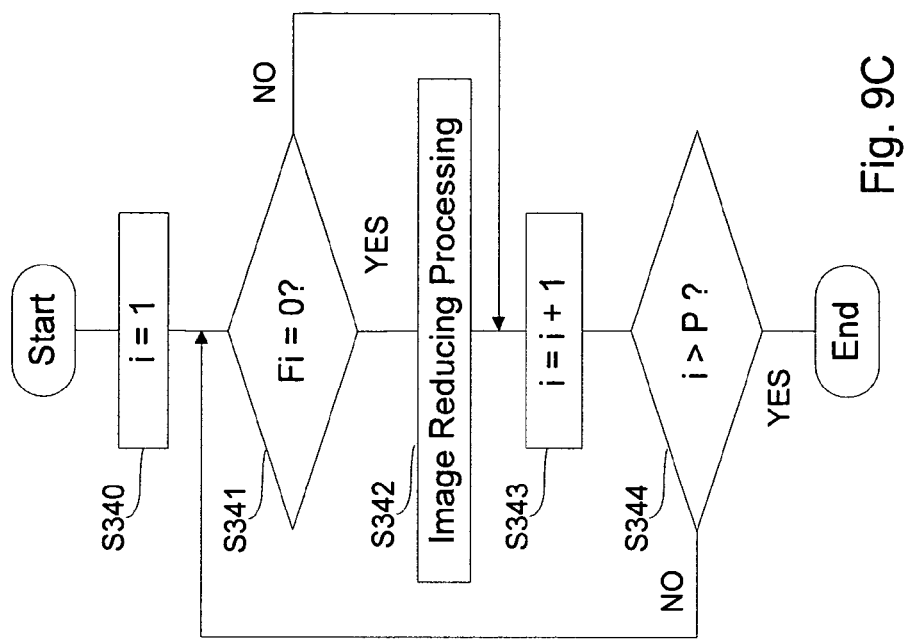
Figure 9B:
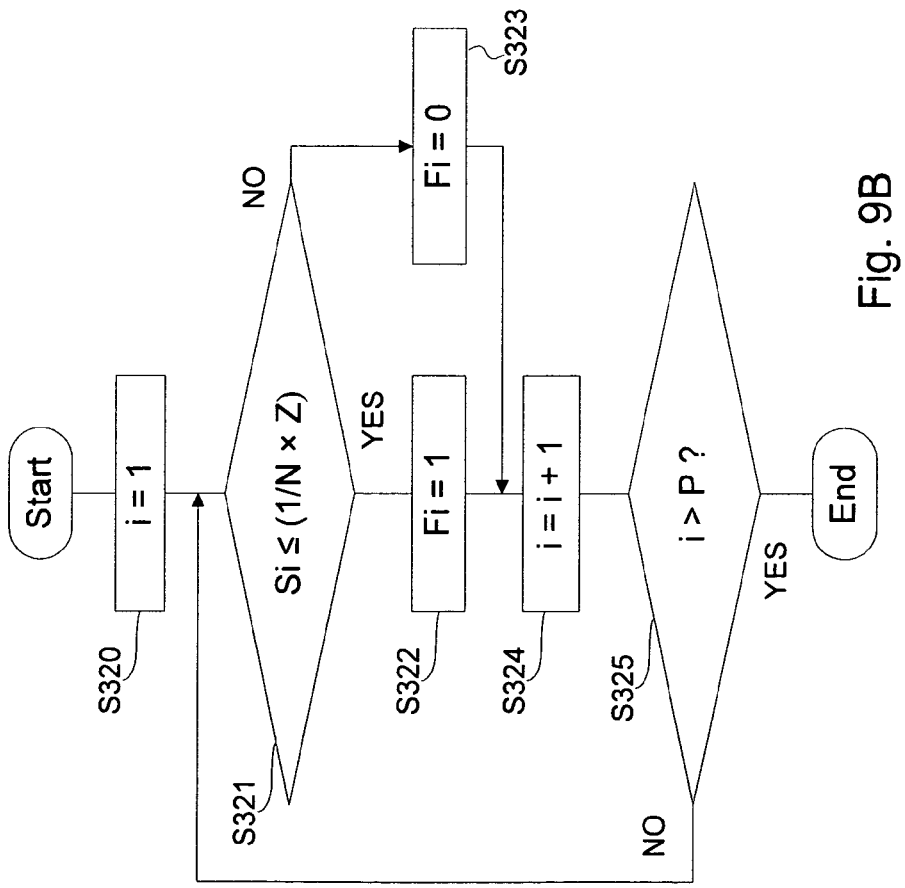
Figure 10:
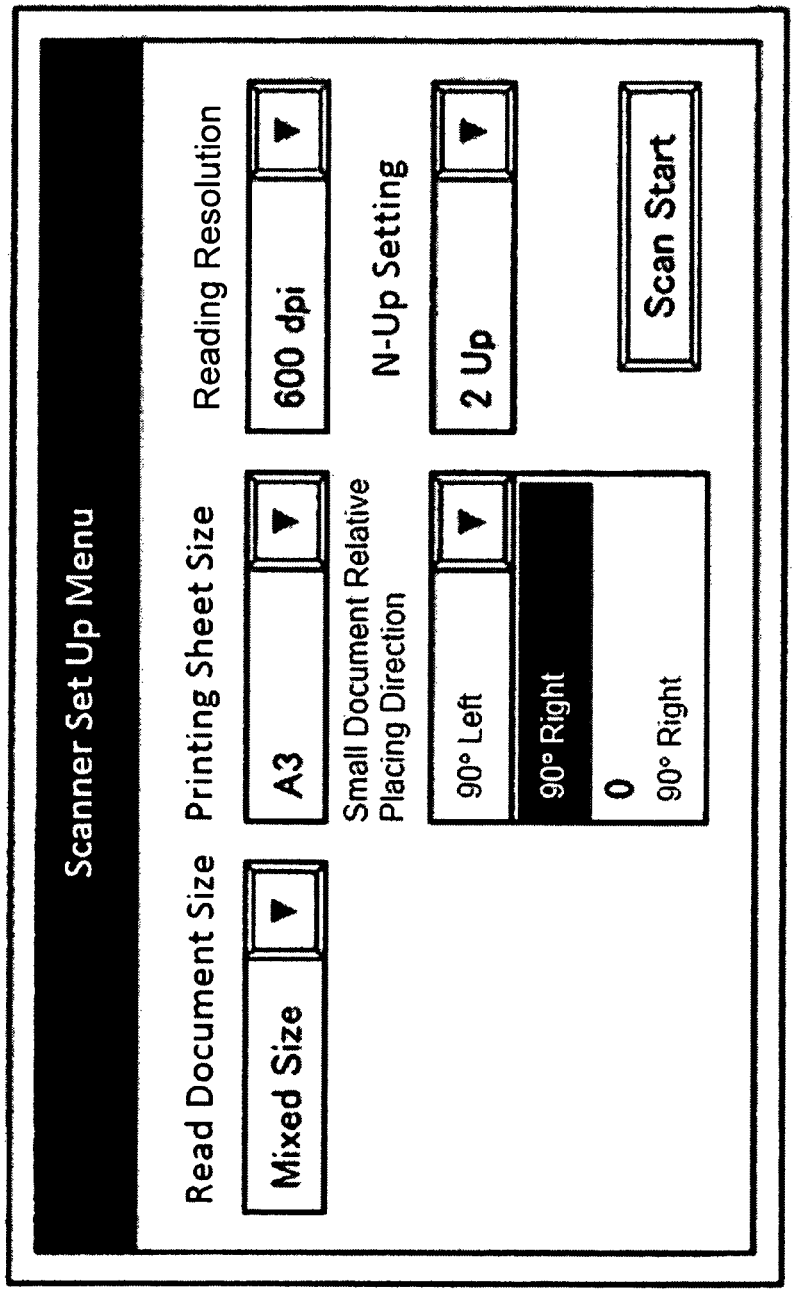
FIG. 10 is an explanatory diagram of a scanner setup menu according to a second disclosed embodiment.

Next, the performance of the scanner 100 is explained based on the flow diagrams of FIGS. 9A, 9B and 9C referring to FIGS. 1, 3, 6, 7 and 8. First of all, the flow diagram of FIG. 9A is explained. At 5301, the ADF unit 103 of the scanner 100 starts reading the documents, and the input part 120 receives the image information of the documents that were read (Data Reception).

At S302, the input part 120 stores the image information of the document in the memory part 124 (Registration of Received Data). Here, the sheet number of the read documents is P (where P is an integer number of equal to or greater than 1). At S303, the document size detecting part 121 detects the document size Sp (where p=1, 2 . . . , P) of each page of the image information read at the input part 120 (Detection of Each Document Size Sp). At S304, the document size detecting part 121 stores the detected document size Sp of the each page in correspondence with the page numbers of the image information table of the memory part 124 (Registration of Document Size Sp). The document size of each page is determined by detecting a trailing edge of the document from the read image information.

At S305, the setting value detecting part 122 reads a setting value N for an N-Up printing that has previously been set (i.e., has been preset) with the operation panel 104 after the input part 120 reads the image information (Detection of Setting Value N for N-Up Printing).

At 5306, the setting value detecting part 122 stores the read setting value N in the image information table in the memory part 124 (Registration of Setting Value N). At S307, the sheet size detecting part 123 reads a printing sheet size Z on which the image information is to be printed (Detection of Printing Sheet Size Z).

At S308, the sheet size detecting part 123 stores the printing sheet size Z in the image information table of the memory part 124 (Registration of Printing Sheet Size Z). At S309, the editing part 125 determines whether or not to arrange the image information with the same magnification or to arrange the image information by reducing the size based on the setting value N that was detected at the setting value detecting part 122 and the printing sheet size Z that was detected at the sheet size detecting part 123. The result of the determination is stored as the same magnification flag Fp (where p is the read page numbers, p=1, 2, . . . , p) in the image information table of the memory part 124 in correspondence with the page numbers of the documents (Registration of Same Magnification Flag Fp).

Here, the registration processing of the same magnification Fp in the memory part is explained in the flow diagram of FIG. 9B. At S320, an integer number "1" is set a value for the variable i (i.e., set i=1). At S321, the document size Si of each page and a divided area DA for each page are compared. Here the divided area DA is the product of the value 1/N and the value of the printing sheet size Z (i.e., DA=1/N×Z). These two values are compared to determine whether Si is less than or equal to the reduction factor times the printing sheet size (i.e., determine whether Si<(1/N×Z)).

At S322, when the document size Si is equal to or less than the area of the one document (1/N×Z), the same magnification flag Fi is set to have a value of "1" (i.e., set Fi=1). At S323, on the other hand, when the document size Si is larger than the product, the same magnification flag Fi is set to have a value of "0" (i.e., set Fi=0).

At S324, the variable number i is incremented (i.e., set i=i+1). At S325, the processing operations S321-S324 repeat until the variable number i exceeds the read page number P of the entire document (i.e., until i>P). When i exceeds P (i.e., the determination of whether i>P is Yes), the registration processing of the same magnification flag Fp in the memory part ends. When the settings of all of the same magnification flags F are completed, the processing returns to the explanation of FIG. 9A. At S310, the editing part 125 edits the image information of the read documents according to the values of the same magnification flag F (Data Edition).

Here, the editing processing of the image information of the documents performed by the editing part 125 is explained with reference to the flow diagram of FIG. 9C. At S340, the variable "i" is set to an integer value of "1" (i.e., set i=1). At S341, the processing judges whether or not the same magnification flag Fi of each page of the read documents is "0." In other words, it judges whether or not it is necessary to reduce the image information of the document (i.e., it determines whether Fi=0). When the result of this determination is Yes, operation proceeds to S342. When the result of this determination is No, operation proceeds to S343, skipping S342.

At S342, when the processing judges that the same magnification flag Fi is "0" (i.e., a determination of Yes at S341), the image information of the document needs to be reduced. As a result, the editing part 125 reduces the image information of the document by 1/N (i.e., generated reduced image information), and arranges the reduced image on an area for one document on the printing sheet at S342 (Image Reducing Processing). On the other hand, when the same magnification flag Fi is "1" (i.e., a determination of No at S341), operation S342 is skipped. In other words, the editing part 125 arranges the image information of the document with its original magnification on the area for the document on the printing sheet, without reducing its size. Operation then proceeds to S343.

At S343, the processing updates the variable "i" by incrementing it by one (i.e., set i=i+1). At S344, processing operations S341-S343 repeat until the variable "i" exceeds the page number P of the entire documents (i.e., until i>P). When i exceeds P (i.e., the determination of whether i>P is Yes), the editing processing of the image information of the document ends. By doing this type of editing processing of the image information, the images of the document (A3) shown in rows (a) and (b) in FIG. 8 are reduced to ½ and arranged in a single recording sheet because the document sizes of A3 are larger than the divided area for one document (½×A3)

On the other hand, as shown in row (a) of FIG. 8, the document size of A4 is equal to the divided area for one document of the printing sheet. As a result, it is arranged with the same magnification (i.e., without being reduced to ½ size) on the printing sheet. Likewise, because the document size of A5 shown in row (b) of FIG. 8 is smaller than the divided area for one document, it is arranged on the printing sheet with same magnification (i.e., without being reduced to ½ size). Accordingly, the scanner 100 performs the processing from reading of the image information of the document by the input part 120 until generating the print image data. In this way, the scanner 100 prints a first number of non-reduced images and a second number of reduced images on the printing sheet, where the first number is an integer equal to or greater than 0, the second number is an integer equal to or greater than 0, and wherein the sum of the first and second numbers is equal to the setting value N.

The explanation of FIG. 9A will continue. At S311, the print image data that is edited by the editing part 125 is transmitted to the printer 200, and is printed (Print). Moreover, in the present disclosed embodiment, the input part 120 is explained as the ADF unit 103 of the scanner 100 which reads the image of the document. However, the input part may be realized as a receiving part for receiving image information of the document from the external device such as host computer.

As explained above, with respect to the first disclosed embodiment, when multi-page printing is performed, the size of the document to be read and the size of the area of one page of the document to be arranged for printing are compared, and when the size of the document to be read is equal to or smaller than the size of the area of the one page of the document to be arranged, the image information of the document is printed with its original magnification without reducing its size. Therefore, the effect of easy viewing of the printing result is obtained.

Second Embodiment

In the structure of the second disclosed embodiment, a menu for setting a small document relative placing direction is added to the scanner setup menu of the first disclosed embodiment. The same numbers are applied to the same parts as of the first disclosed embodiment explained based on FIGS. 1, 2, 3, 4, 5, and 7, and their explanations are omitted. Setting items at the operation panel 104 are explained based on the explanatory diagram of the scanner setup menu of the second disclosed embodiment. The setting items are required to be set before the input part 120 reads the image information.

The explanation of the read document size for reading, the printing sheet size, the reading resolution, the N-Up setting and the scan start button on the scanner set up menu are omitted as they are same as the first disclosed embodiment. The small document relative placing direction menu is added to the above structure in the second disclosed embodiment. The small document relative placing direction menu is used for setting a placing direction of the small size document with respect to a direction of the largest size document placed in the sheet tray 102 among a plurality of documents placed in the sheet tray 102.

For example, in this small document relative placing direction menu of the disclosed embodiment, "90 degrees left", "0" and "90 degrees right" can be set as parameters. The "90 degrees left" is set when a small size document is placed in the sheet tray 102 such that the small size document is oriented 90 degrees to left with respect to the large size document. The directions of the documents are shown, by way of example, in FIG. 11, row (e). (See reference numeral 177 in "Sheet Setting Method for ADF.") The "0" is set when a small size document is placed in the sheet tray 102 such that the small size document is oriented in the same direction as the large size document as shown, by way of example, in rows (c) and (f) in FIG. 11. See reference numeral 170 in row (c) and reference numeral 181 in row (f) in "Sheet Setting Method for ADF." The "90 degrees right" is set when a small size document is placed in the sheet tray 102 such that the small size document is oriented 90 degrees to right with respect to the large size document as shown with reference 173 in FIG. 11.

In this disclosed embodiment, the parameters that are set at the small document relative placing direction menu are set before the images of the documents are read at the input part 120, and the set parameters are memorized in the memory part 124. The functions of the aforementioned structure are explained hereafter. First of all, in the present disclosed embodiment, the print result of 2-Up printing (i.e., if N=2) is explained based on the explanatory diagram of the print result of the second disclosed embodiment of FIG. 11. The printing sheet size in this embodiment is set as A4.

Figure 11:
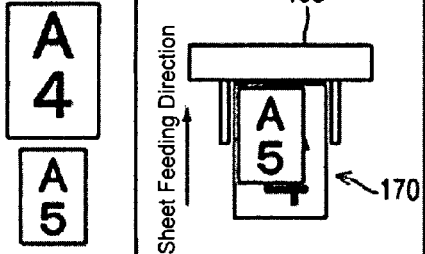
FIG. 11 is an explanatory diagram of the printing result according to the second disclosed embodiment.

Row (c) of FIG. 11 shows sequences when two documents (of size A4 and A5) are placed in the sheet tray 102 so that they are both facing the same direction (i.e., the longitudinal directions of the documents are in the sheet feeding direction of the document of the ADF unit 103). In this case, according to the printing result of the 2-Up printing of a conventional system, the read documents are rotated by 90 degrees to the right and all of the image information of the documents is reduced to ½ size and is arranged on the printing sheet 171 regardless of the document sizes.

As with the printing result of the 2-Up printing by the first disclosed embodiment, the read documents are rotated by 90 degrees to right, and the image information of the A4 document is reduced to ½ size. In contrast, the A5 document is arranged with is original magnification on the printing sheet 172. Row (f) of FIG. 11 shows sequences when two documents (of size A4 and A5) are placed in the same direction in the sheet tray 102 (the longitudinal direction of the documents are perpendicular to the sheet feeding direction of the documents of the ADF unit 103).

In this case, according to the print result of 2-Up print by the conventional system, the read documents do not rotate, and both of the image information of the documents are reduced to ½ size regardless of the original document sizes, and are arranged on the printing sheet 182. In contrast, according to the first disclosed embodiment, the read documents do not rotate, and only the image information of the A4 size document is reduced to ½ size, while the A5 size document is arranged with its original magnification on the printing sheet 183.

Moreover, in the second disclosed embodiment, when "0" is set as parameter of the small document relative placing direction, the same print result as the first disclosed embodiment can be obtained. Moreover, in this embodiment, the document size detecting part 121 detects whether or not a longitudinal direction of the document placed in the sheet tray 102 is oriented along the sheet feeding direction of the document of the ADF unit 103. The document size detecting part 121 may detect whether or not a lateral direction of the document in the sheet tray 102 is oriented along the sheet feeding direction.

Row (d) of FIG. 11 shows sequences when the longitudinal direction of the small size document (of A5 size) is rotated 90 degrees to the right with respect to the longitudinal direction of the large size document (of A4 size), and is placed in the sheet tray 102. In this case, according to the 2-Up printing by the conventional method, each read document is rotated 90 degrees to right, and the image information of the both documents is reduced to ½ size regardless of the document sizes. The images are arranged on the printing sheet 174.

According to the 2-Up printing according to the first disclosed embodiment, each read document is rotated 90 degrees to the right, and the image information of the A4 size document is reduced to ½ size and is arranged on the printing sheet 175. However, the image information of the A5 size document is arranged with its original magnification on the printing sheet 175. Therefore, a part of the image of the A5 size document is not printed properly on the printing sheet 175. In the second disclosed embodiment, however, by setting "90 degrees to right" as the parameter of the small document relative placing direction, the system is instructed to rotate the small document image 90 degrees to left with respect to the largest document image printed on the printing sheet so that the image of the small document image is arranged in the same direction as the largest document image when the small document image is arranged on the divided area for one document on the printing sheet 176. Accordingly, the cut-off printing described on the first disclosed embodiment is prevented.

FIG. 11(e) shows sequences when the longitudinal direction of the small size document (A5) is rotated 90 degrees to left with respect to the longitudinal direction of the large size document (A4), and is placed in the sheet tray 102. In this case, according to the conventional method of 2-Up printing, the read documents do not rotate, and the image information of both documents are reduced to ½ size regardless of the document sizes, and are arranged on the printing sheet 178.

According to the first disclosed embodiment, the read documents do not rotate, and the image information of the A4 document is reduced to ½ size, and is arranged without rotation. The image information of the A5 document is not reduced in size, and is arranged with same magnification on the printing sheet 179. As a result, a part of the image of the A5 document is not printed properly. In the second disclosed embodiment, by setting "90 degrees to left" as the parameter of the small document relative placing direction, the system is instructed to rotate the small document image 90 degrees to right with respect to the largest document image printed on the printing sheet so that the image of the small document image is arranged in the same direction of the largest document image when the small document image is arranged on the divided area for one document on the printing sheet 180. Accordingly, the cut-off printing described on the first disclosed embodiment is prevented.

Accordingly, in the second disclosed embodiment, by setting a rotation direction of the small document before the printing operation (as the parameter of the small document relative placing direction), the system is controlled to print different size documents on a single printing sheet referring to the longitudinal direction of the largest document. Also, the system is controlled to arrange the different size documents in the same direction on a single printing sheet.

Figure 12A:
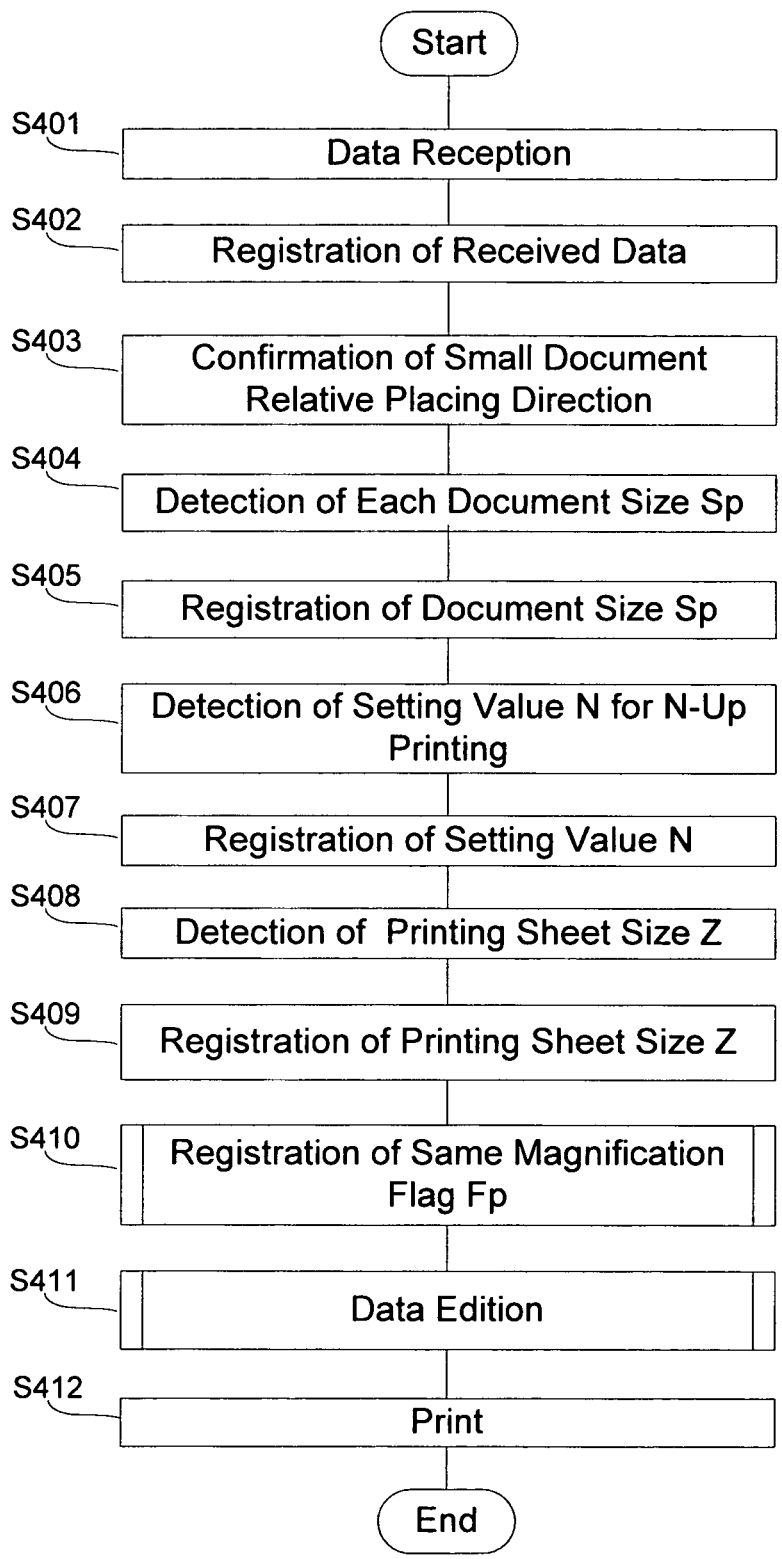
FIGS. 12A and 12B are flow diagrams showing the image processing according to the second disclosed embodiment.
Figure 12B:
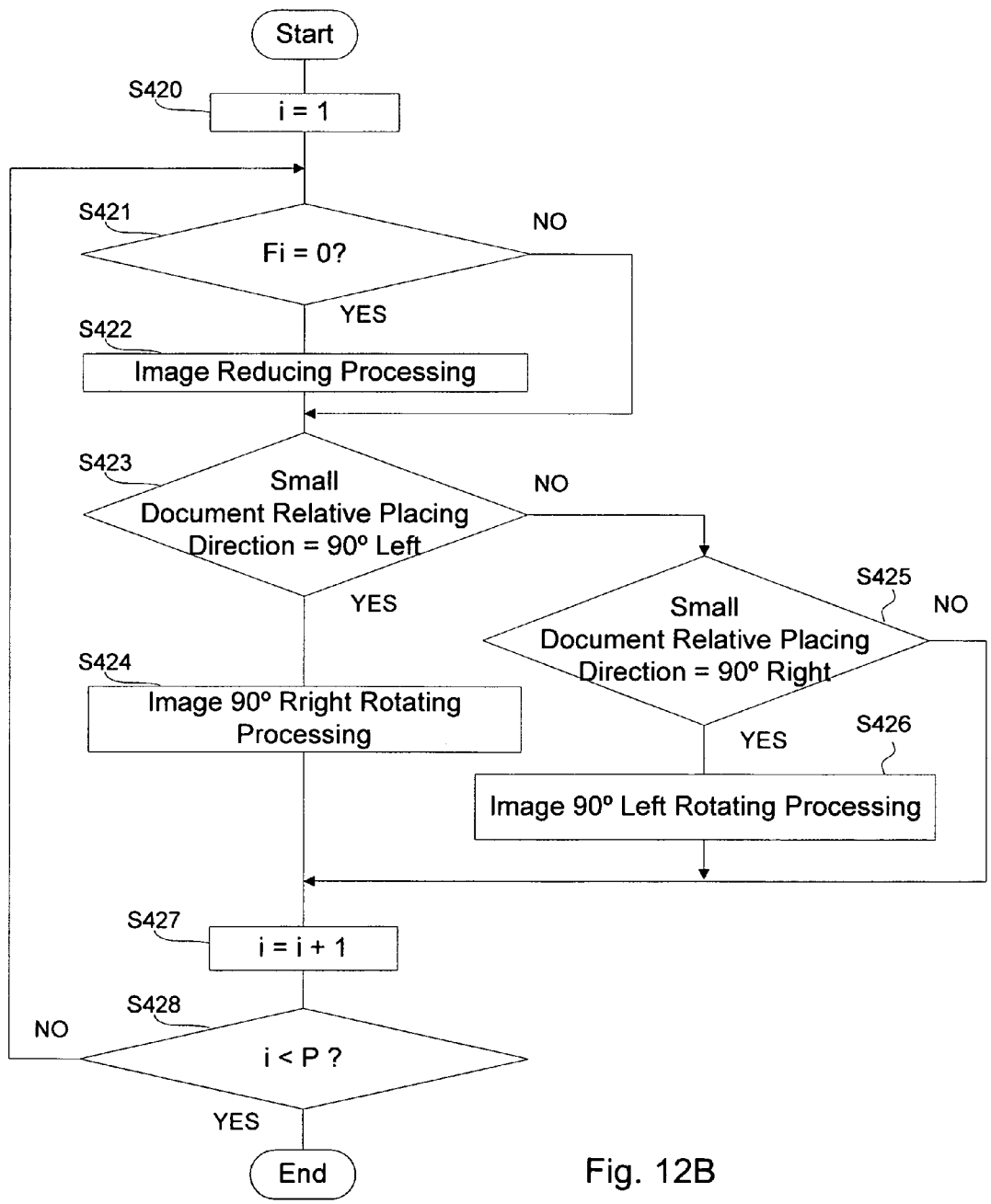

Next, the performance of the scanner 100 in the second disclosed embodiment is explained based on FIGS. 12A and 12B, referring to FIGS. 1, 3, 7, 10 and 11. As shown in FIG. 12A, at S401, the ADF unit 103 of the scanner 100 starts reading a document, and the input part 120 receives image information of the read document (Data Reception).

At S402, the input 120 stores the image information of the document in the memory part 124 (Registration of Received Data). Here, the sheet number of the read documents is P (where P is an integer number equal to or greater than 1). At S403, the control part reads a setting value of "small document relative placing direction" that is preset by the operation panel 104, and stores the value in the memory part 124 (Confirmation of Small Document Relative Placing Direction). At S404-S410, these processes comparable to S303-S309 of FIG. 9A, and so the explanations are omitted.

At S411, the editing part 125 edits the image information of the read document according to the value of the same magnification flag Fi when the setting of the same magnification flag Fi is completed. Here, the editing processing of the image information of the document that is performed by the editing part 125 is explained with reference to FIG. 12B. At S420, a variable i is set to the integer "1" (i.e., set i=1).

At S421, the processing judges whether or not the same magnification flag Fi of each page of the read document is "0." In other words, it judges whether or not the image information of the document needs to be reduced (which is true if Fi=0). At S422, if the same magnification flag Fi is "0" at S421, the editing part 125 reduce the image information of the document to 1/N size, and arranges the image information on the divided area for one document on the recording sheet (Image Reducing Processing).

On the other hand, at S421, when the same magnification flag Fi is "1," the editing part 125 arranges the image information of the documents without a reduction on the area of the document on the printing sheet. At S423, the editing part 125 judges whether or not the setting value of "small document relative placing direction" that is memorized in the memory part 124 is "90 degrees left." When it is "90 degrees left," the processing proceeds to S424. When it is not "90 degrees left," the processing proceeds to S425.

At S424, when the processing judges that the setting value of the "small document relative placing direction" is "90 degrees left" at S423, the editing part 125 rotates only the image information of the small document 90 degrees to right, and the processing proceeds to S427. At S425, the editing part 125 judges whether or not the setting value of "small document relative placing direction" that is memorized in the memory part 124 is "90 degrees right," and when it is not "90 degrees right" (namely, when the setting value of "the small document relative placing direction" is "0"), the processing proceeds to S427.

At S426, when the processing judges that the setting value of "the small document relative placing direction" is "90 degrees right" at S425, the editing part 125 rotates only the image information of the small document 90 degrees to left, and the processing proceeds to S427. At S427, the variable "i" is set to the integer "1" (i.e., set i=1) and is updated. At S428, processing repeats S421-S427 until the variable i exceeds the page number P of the entire read documents (i.e., until i>P), and when it exceeds, the editing processing of the image information of the document ends.

By performing this type of editing processing of image information, as shown in rows (a) and (e) of FIG. 11, even when the longitudinal direction of the small size document (A5) is placed in the sheet tray 102 such that the document is oriented 90 degrees to the right or left with respect to the longitudinal direction of the large size document (A4), the image of the small document can be printed properly. In operation, the image of the small document is arranged by rotating it 90 degrees to right direction or left direction by following the setting of "90 degrees right" or "90 degrees left" of the small document relative placing direction when the image of small document on the divided area for one document is arranged on the printing sheet. Accordingly, images are always printed properly no matter which size these documents are. Also, the directions of the images that are arranged on the same printing sheet can be arranged along the same direction and printed.

The remainder of FIG. 12A is explained hereafter. At S412, the print image data edited by the editing part 125 is transmitted to the printer 200 and printed. As explained above, in the second disclosed embodiment, in addition to the effects of the first disclosed embodiment, even when the directions of the documents are different, all of the images of the documents can be printed without cutting off the images that are arranged on the printing sheet.

Moreover, the effect of printing all of the images of the documents facing the same direction can be achieved. Furthermore, in the first and second disclosed embodiments, the image processing device was explained as a multifunction machine; however, it can be a facsimile machine, a copier or a printer.

What is claimed is:

1. An image processing device for arranging and printing images of a plurality of documents on a single recording sheet comprising:
    a memory part configured to memorize: image information of the plurality of documents, sizes of the plurality of documents, a size of the single recording sheet, and a number of the plurality of documents that are to be arranged on the single recording sheet;
    a document reading part configured to read the plurality of documents including a first document having a first size and a second document having a second size that is different from the first size, to generate image information of the plurality of read documents, and to have the memory part memorize the image information;
    a document size detecting part configured to detect a size of each of the plurality of documents from the image information memorized in the memory part and to have the memory part memorize the size of each of the plurality of read documents;
    an editing part configured to calculate a divided area of the single recording sheet by dividing the size of the single recording sheet by the number of the plurality of read documents that are to be arranged on the single recording sheet; and
    a designation part that is configured to designate a rotational direction of the first document of the plurality of read documents relative to the second document of the plurality of read documents based on a relative placing direction specified by a user, wherein
    the editing part is further configured to compare the size of each of the plurality of read documents in the memory part with the divided area of the single recording sheet, the divided area of the single recording sheet being determined by dividing the size of the single recording sheet by the number of the plurality of read documents that are to be arranged on the recording sheet,
    the editing part is further configured to arrange and print the image information of one of the plurality of read documents on the single recording sheet without reducing the image of the one of the plurality of documents when the size of the one of the plurality of documents is equal to or less than the size of the divided area of the single recording sheet, the number of the plurality of read documents that are to be arranged on the recording sheet is two or more, and the image information of the first document is rotated based on the designated rotational direction.

2. The image processing device of claim 1, wherein the memory part is further configured to memorize a rotation direction of the plurality of read documents that are to be arranged on the recording sheet before printing; and the editing part is further configured to rotate any of the plurality of read documents that are of a size equal to or less than the divided area of the single recording sheet based on the rotation direction, and to arrange and print the plurality of read documents on the recording sheet.

3. The image processing device of claim 2, wherein the rotating involves rotating the associated image by 90 degrees to the right or left based on the rotation direction.

4. The image processing device of claim 1, wherein the image information that is read by the document reading pan includes image information of different sizes of documents.

5. The image processing device of claim 1, further comprising:

a setting value detecting part configured to detect a setting value equal to the number of the plurality of read documents that are to be arranged on the recording sheet.

6. The image processing device of claim 1, further comprising:

a sheet size detecting part configured to detect the size of the single recording sheet.

7. The image processing device of claim 1, wherein the document size detecting part is further configured to detect an input direction of each of the plurality of read documents from the image information, the editing part arranges and prints the image information of each one of the plurality of read documents on the single recording sheet in an output direction determined based on the input direction thereof without reducing the image of the one of the plurality of read documents when the size of the one of the plurality of read documents is equal to or less than the size of the divided area of the single recording sheet, and the editing part compares the size of each of the plurality of read documents and changes the output direction of one of the plurality of read documents if the input direction of the one of the plurality of read documents differs from the output direction of another one of the plurality of read documents that has the largest size among the plurality of read documents, so that the one of the plurality of read documents is arranged and printed in the same output direction as the output direction of the another one of the plurality of read documents.

8. The image processing device of claim 1, further comprising:

the designation part that is configured to receive a designation of the size of each of the plurality of documents to be read, wherein when a mixed size is designated, the image processing device enables the arrangement and printing of the images of the plurality of documents using the memory part, the document reading part, the document size detecting part and the editing part.

9. A method of processing a plurality of images, comprising:

reading each of a plurality of documents by a document reading part;

capturing a set of image information for each of the plurality of read documents, each set of image information corresponding to one of images of the plurality of read documents, the plurality of read documents including a first document having a first document size and a second document having a second document size that is different from the first document size;

detecting a document size of each of the plurality of read documents;

detecting a setting value, the setting value being an integer that indicates how many of the plurality of images will be printed on a printed page;

detecting a printing sheet size of the printed page;

determining a divided area that is equal to the printing sheet size divided by the setting value; comparing the document size of each of the plurality of read documents with the divided area to determine for each of the plurality of read documents whether a corresponding document size is greater than the divided area;

printing a first number of non-reduced images on the printed page corresponding to each set of the image information whose corresponding document size is not greater than the divided area;

performing image reducing processing on each set of the image information whose corresponding document size is greater than the divided area to generate a set of reduced image information and printing a second number of reduced images on the printed page corresponding to each set of reduced image data;

designating a rotational direction of the first document of the plurality of read documents relative to the second document of the plurality of read documents based on a relative placing direction specified by a user; and rotating the first document based on the designated rotational direction, wherein the first number is an integer equal to or greater than 1, wherein the second number is an integer equal to or greater than 0, wherein the sum of the first and second numbers is equal to the setting value, and wherein the setting value is an integer greater than 1.

10. The method of processing an image, according to claim 9, wherein the image reducing processing comprises dividing the document size by the setting value.

11. The method of processing an image, according to claim 9, wherein the detecting of the document size of the received document is performed based on the captured image information.

12. The method of processing an image, according to claim 9, wherein the set of image information for each of the plurality of read documents includes sets of image information of different sizes of documents.

13. The method of processing an image, according to claim 9, further comprising:

determining a rotation direction of each of the plurality of read documents before printing; and performing image rotating processing on the image information of documents that are of a size equal to or less than the divided area based on the rotation direction, prior to the operations of printing the first number of non-reduced images and performing image reducing processing.

14. The method of processing an image, according to claim 13, wherein the image rotating processing involves rotating the associated image by 90 degrees to the right or left.

15. The method of processing an image, according to claim 9, further comprising:
storing a same magnification flag in a memory part corresponding to each of the plurality of read documents, the same magnification flag indicating whether or not the document size of the corresponding read document is greater than the divided area.

16. The method of processing an image, according to claim 9, further comprising:
detecting a capturing direction of the plurality of read documents;
comparing the document sizes of the plurality of read documents; and
changing a printing direction of one of the plurality of read documents if the printing direction of the one of the plurality of read documents differs from the printing direction of another one of the plurality of read documents that has the largest document size among the plurality of read documents, so that the one of the plurality of read documents is arranged and printed in the same printing direction as the printing direction of the another one of the plurality of read documents, wherein
the first number of non-reduced images is printed in a printing direction determined based on the capturing direction on the printed page corresponding to each set of the image information whose corresponding document size is not greater than the divided area, and
the image reducing processing is performed on each set of the image information whose corresponding document size is greater than the divided area to generate a set of reduced image information and printing a second number of reduced images in the printing direction determined based on the capturing direction on the printed page corresponding to each set of reduced image data.

17. The method of processing an image, according to claim 9, further comprising:
receive a designation of the size of each of the plurality of documents to be read, wherein
the method is performed when a mixed size is designated.

18. An image processing device for arranging and printing images of a plurality of documents on a single recording sheet comprising:
a document reading part configured to read the plurality of documents including a first document having a first size and a second document having a second size that is different from the first size and to generate image information of the plurality of documents;
a document size detecting part configured to detect a size of each of the plurality of read documents based on the image information;
a memory part configured to store: the image information of the plurality of documents, the sizes of the plurality of read documents, a size of the single recording sheet, and a setting value that indicates a number of the plurality of read documents that are to be arranged on the single recording sheet;
a setting value detecting part configured to detect the setting value from the memory part;
a sheet size detecting part configured to detect the size of the single recording sheet from the memory part; and
an editing part configured to:
determine a divided area of the single recording sheet by dividing the size of the single recording sheet by the setting value,
compare the size of each of the plurality of read documents in the memory part with the divided area of the single recording sheet, and
arrange and print images on each recording sheet corresponding to the image information of a number of documents from the plurality of read documents equal to the setting value, wherein
for each selected document of the number of documents,
non-reduced image corresponding to the image information of the selected document is arranged and printed on the single recording sheet when the size of the selected document is equal to or less than the size of the divided area of the single recording sheet,
reducing processing is performed on the image information of the selected document to generate reduced image information when the size of the selected document is equal to or less than the size of the divided area of the single recording sheet, and
a reduced image corresponding to the reduced image information of the selected document is arranged and printed on the single recording sheet when the size of the one of the selected document is equal to or less than the size of the divided area of the single recording sheet,
the setting value is an integer greater than 1, and
the document size detecting part is further configured to detect an input direction of each of the plurality of documents based on the image information,
the editing part arranges and prints images on each recording sheet corresponding to the image information of the number of documents from the plurality of read documents equal to the setting value, in an output direction determined based on the input direction of the plurality of documents, and
the output direction of one of the plurality of read documents is changed if the output direction of the one of the plurality of read documents differs from the output direction of another one of the plurality of read documents that has the largest size among the plurality of read documents, so that the one of the plurality of read documents is arranged and printed in the same printing direction as the output direction of the another one of the plurality of read documents.

19. The image processing device of claim 18, wherein
the document reading part detects a rotation direction of the plurality of read documents that are to be arranged on the recording sheet before printing;
the memory part is further configured to memorize the rotation direction of the plurality of read documents that are to be arranged on the recording sheet before printing; and
the editing part is further configured to rotate any of the plurality of read documents that are of a size equal to or less than the divided area of the tingle-recording sheet based on the rotation direction, and to arrange and print the plurality of read documents on the recording sheet.

20. The image processing device of claim 18, wherein
the rotating involves rotating the associated image information by 90 degrees to the right or left based on the rotation direction.

21. The image processing device of claim 18, wherein
the image information that is generated by the document reading part includes image information of different sizes of documents.

22. The image processing device of claim 18, wherein
the editing part is further configured to generate a same magnification flag corresponding to each of the plurality of read documents, the same magnification flag indicating whether or not the document size of the corresponding read document is greater than the divided area, and
the same magnification flag is stored in the memory part.

23. The image processing device of claim 18, wherein
the image processing device is an image scanner.

24. The image processing device of claim 18, further comprising:
a designation part that is configured to designate a rotational direction of the first document of the plurality of read documents relative to the second document of the plurality of read documents, wherein
the image information of the third document is rotated based on the designated rotational direction.

25. The image processing device of claim 18, further comprising:
the designation part that is configured to receive a designation of the size of each of the plurality of documents to be read, wherein
when a mixed size is designated, the image processing device enables the arrangement and printing of the images of the plurality of documents using the document reading part, the document size detecting part, the memory part, the setting value detecting part, the sheet size detecting part and the editing part.

\* \* \* \* \*